United States Patent
Seno

(10) Patent No.: US 12,420,713 B2
(45) Date of Patent: Sep. 23, 2025

(54) VEHICLE DISPLAY SYSTEM

(71) Applicant: Takamitsu Sangyou Co., Ltd., Fukuoka (JP)

(72) Inventor: Hachirou Seno, Fukuoka (JP)

( * ) Notice: Subject to any disclaimer, the term of this patent is extended or adjusted under 35 U.S.C. 154(b) by 40 days.

(21) Appl. No.: 18/536,268

(22) Filed: Dec. 12, 2023

(65) Prior Publication Data
US 2024/0131990 A1   Apr. 25, 2024
US 2024/0227679 A9   Jul. 11, 2024

Related U.S. Application Data

(63) Continuation of application No. PCT/JP2022/014097, filed on Mar. 24, 2022.

(30) Foreign Application Priority Data

Jun. 17, 2021 (JP) .................. 2021-100813

(51) Int. Cl.
   *B60R 1/24*   (2022.01)
   *B60R 1/26*   (2022.01)
   *H04N 7/18*   (2006.01)

(52) U.S. Cl.
   CPC .............. *B60R 1/24* (2022.01); *B60R 1/26* (2022.01); *H04N 7/183* (2013.01); *B60R 2300/308* (2013.01)

(58) Field of Classification Search
   CPC ....... B60R 1/24; B60R 1/26; B60R 2300/308; B60R 1/00; B60R 11/02; B60R 13/00;
   (Continued)

(56) References Cited

U.S. PATENT DOCUMENTS

2003/0210806 A1* 11/2003 Yoichi ................ G01C 21/3647
                                                              382/104
2007/0115138 A1   5/2007 Arakawa
(Continued)

FOREIGN PATENT DOCUMENTS

JP   H9-261627      10/1997
JP   2003-141696    5/2003
(Continued)

OTHER PUBLICATIONS

English Translaiton of JP 2003167539. (Year: 2003).*
(Continued)

*Primary Examiner* — Farzana Hossain
(74) *Attorney, Agent, or Firm* — SOEI PATENT & LAW FIRM

(57) ABSTRACT

A vehicle display system includes: a camera provided on a vehicle body so as to capture a real-time image of surroundings of the vehicle body, wherein the camera is oriented toward a direction of interest; a monitor configured to display the real-time image captured by the camera, wherein the monitor is oriented toward an opposite direction to the direction of interest; and circuitry configured to: cause the monitor to display an additional image in a first stop period in which the vehicle body stops in accordance with a road condition, wherein a display of the additional image changes in accordance with a position of the vehicle body; and diminish, compared to the first stop period in which the vehicle body stops in accordance with the road condition, the display of the additional image in a second stop period in which the vehicle body stops for boarding or alighting of a passenger.

20 Claims, 11 Drawing Sheets

(58) Field of Classification Search
CPC .......... H04N 7/183; H04N 7/18; G01C 21/26; G08G 1/16; G09F 21/04
See application file for complete search history.

(56) References Cited

U.S. PATENT DOCUMENTS

| | | | |
|---|---|---|---|
| 2008/0068455 | A1 | 3/2008 | Pratt |
| 2014/0052537 | A1* | 2/2014 | Garnet .................. G08G 1/133 705/14.63 |
| 2020/0209864 | A1* | 7/2020 | Chen ................ G01C 21/3811 |
| 2020/0394684 | A1* | 12/2020 | Maekawa .......... G06Q 30/0255 |
| 2022/0284815 | A1* | 9/2022 | Hwang .................. H04W 4/40 |
| 2022/0396202 | A1* | 12/2022 | Tsukamoto ........ G06Q 30/0265 |
| 2022/0412763 | A1* | 12/2022 | Takanashi ............ G08G 1/0969 |

FOREIGN PATENT DOCUMENTS

| | | | |
|---|---|---|---|
| JP | 2003167539 A | * 6/2003 | ............. G09F 13/18 |
| JP | 2003-252153 | 9/2003 | |
| JP | 2005-014784 | 1/2005 | |
| JP | 2005-303793 | 10/2005 | |
| JP | 2006-098348 | 4/2006 | |
| JP | 2007-142624 | 6/2007 | |
| JP | 2008-145719 | 6/2008 | |
| JP | 2010-072713 | 4/2010 | |
| JP | 2011-237878 | 11/2011 | |
| JP | 2011-253486 | 12/2011 | |
| JP | 2012-137482 | 7/2012 | |
| JP | 2018-074315 | 5/2018 | |
| JP | 2018-160135 | 10/2018 | |
| JP | 2021-041884 | 3/2021 | |
| KR | 10-2020-0082553 | 7/2020 | |

OTHER PUBLICATIONS

International Search Report dated May 10, 2022 for PCT/JP2022/014097.
International Preliminary Report on Patentability with Written Opinion dated Dec. 28, 2023 for PCT/JP2022/014097.

* cited by examiner

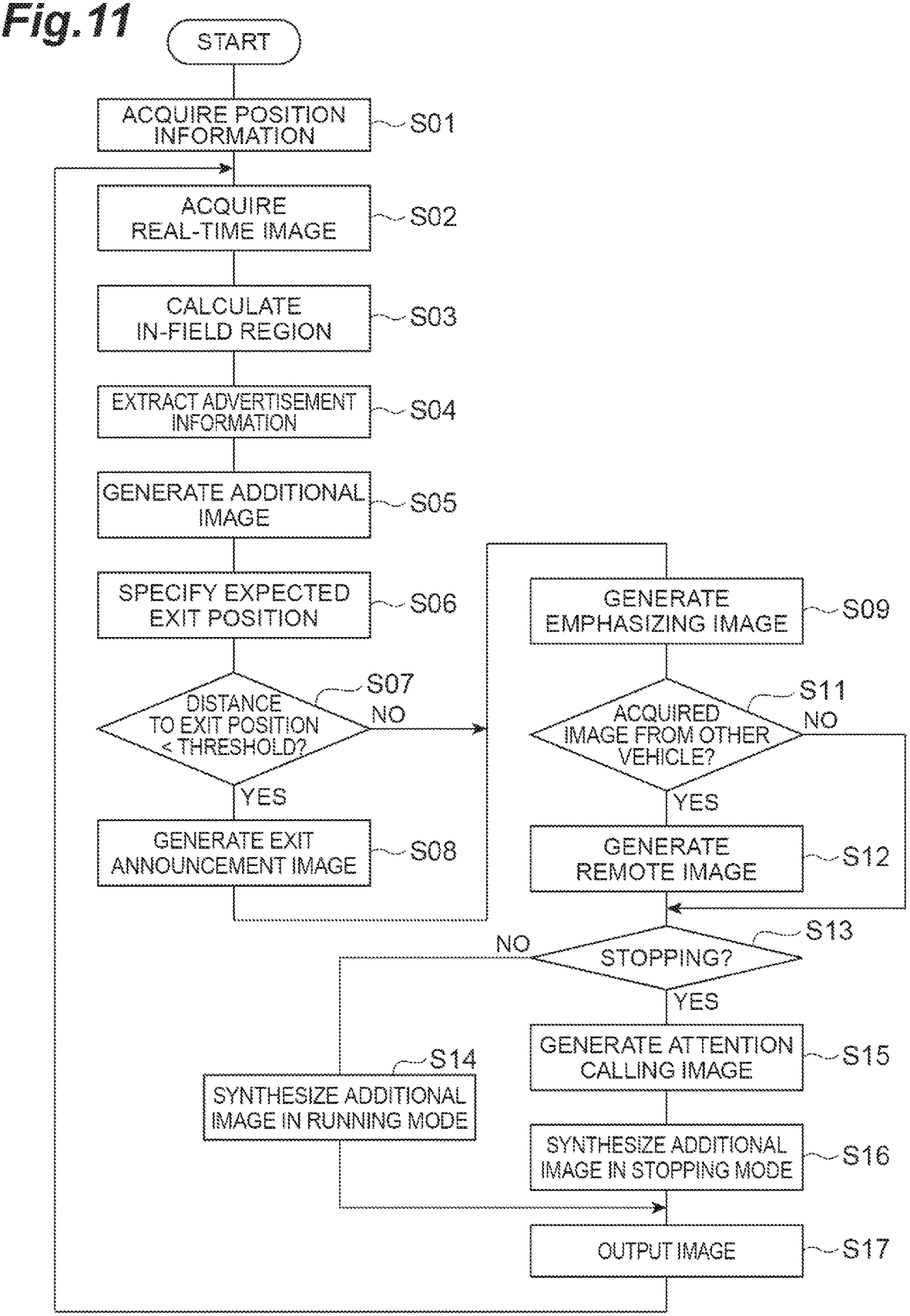

VEHICLE DISPLAY SYSTEM

CROSS-REFERENCE TO RELATED APPLICATIONS

This application is a continuation application of PCT Application No. PCT/JP2022/014097, filed on Mar. 24, 2022, which claims the benefit of priority from Japanese Patent Application No. 2021-100813, filed on Jun. 17, 2021. The entire contents of the above listed PCT and priority applications are incorporated herein by reference.

BACKGROUND

Field

The present disclosure relates to a vehicle display system, a method, and a non-transitory memory device.

Description of the Related Art

Japanese Unexamined Patent Publication No. 2003-252153 discloses an in-vehicle image display device including: a camera installed in a vehicle to capture an image of the front of the vehicle; a storage means including at least movie advertisement image data and still advertisement image data; an image replaying unit replaying the image data stored in the storage means and outputting an image signal; a vehicle state detection means detecting at least one information among a traveling state of the vehicle, a winker state, and an opening/closing state of an entrance door; a monitor installed in the rear of the vehicle so as to be visible from the rear outside the vehicle; and a video signal switching unit switching an image signal from the camera and the image signal from the image replaying part based on detection information from the vehicle state detection means and sending them to the monitor.

SUMMARY

Disclosed herein is a vehicle display system. The vehicle display system may include: a camera provided on a vehicle body so as to capture a real-time image of surroundings of the vehicle body, wherein the camera is oriented toward a direction of interest; a monitor configured to display the real-time image captured by the camera, wherein the monitor is oriented toward an opposite direction to the direction of interest; and circuitry configured to: cause the monitor to display an additional image in a first stop period in which the vehicle body stops in accordance with a road condition, wherein a display of the additional image changes in accordance with a position of the vehicle body; and diminish, compared to the first stop period in which the vehicle body stops in accordance with the road condition, the display of the additional image in a second stop period in which the vehicle body stops for boarding or alighting of a passenger.

Additionally, a method is disclosed herein. The method may include: receiving a real-time image of surroundings of a vehicle body captured by a camera provided on the vehicle body, wherein the camera is oriented toward a direction of interest; displaying the received captured image on a monitor provided on the vehicle body, wherein the monitor is oriented toward an opposite direction to the direction of interest; causing the monitor to display an additional image in a first stop period in which the vehicle body stops in accordance with a road condition, wherein a display of the additional image changes in accordance with a position of the vehicle body; and diminishing, compared to the first stop period in which the vehicle body stops in accordance with the road condition, the display of the additional image in a second stop period in which the vehicle body stops for boarding or alighting of a passenger.

Additionally, a non-transitory memory device is disclosed herein. The non-transitory memory device may have instructions stored thereon that, in response to execution by a processing device, cause the processing device to perform operations include: receiving a real-time image of surroundings of a vehicle body captured by a camera provided on the vehicle body, wherein the camera is oriented toward a direction of interest; displaying the received captured image on a monitor provided on the vehicle body, wherein the monitor is oriented toward an opposite direction to the direction of interest; causing the monitor to display an additional image in a first stop period in which the vehicle body stops in accordance with a road condition, wherein a display of the additional image changes in accordance with a position of the vehicle body; and diminishing, compared to the first stop period in which the vehicle body stops in accordance with the road condition, the display of the additional image in a second stop period in which the vehicle body stops for boarding or alighting of a passenger.

BRIEF DESCRIPTION OF THE DRAWINGS

FIG. 11 is a flowchart illustrating an image display procedure.

DETAILED DESCRIPTION

In the following description, with reference to the drawings, the same reference numbers are assigned to the same components or to similar components having the same function, and overlapping description is omitted.

Vehicle

Figure 1:
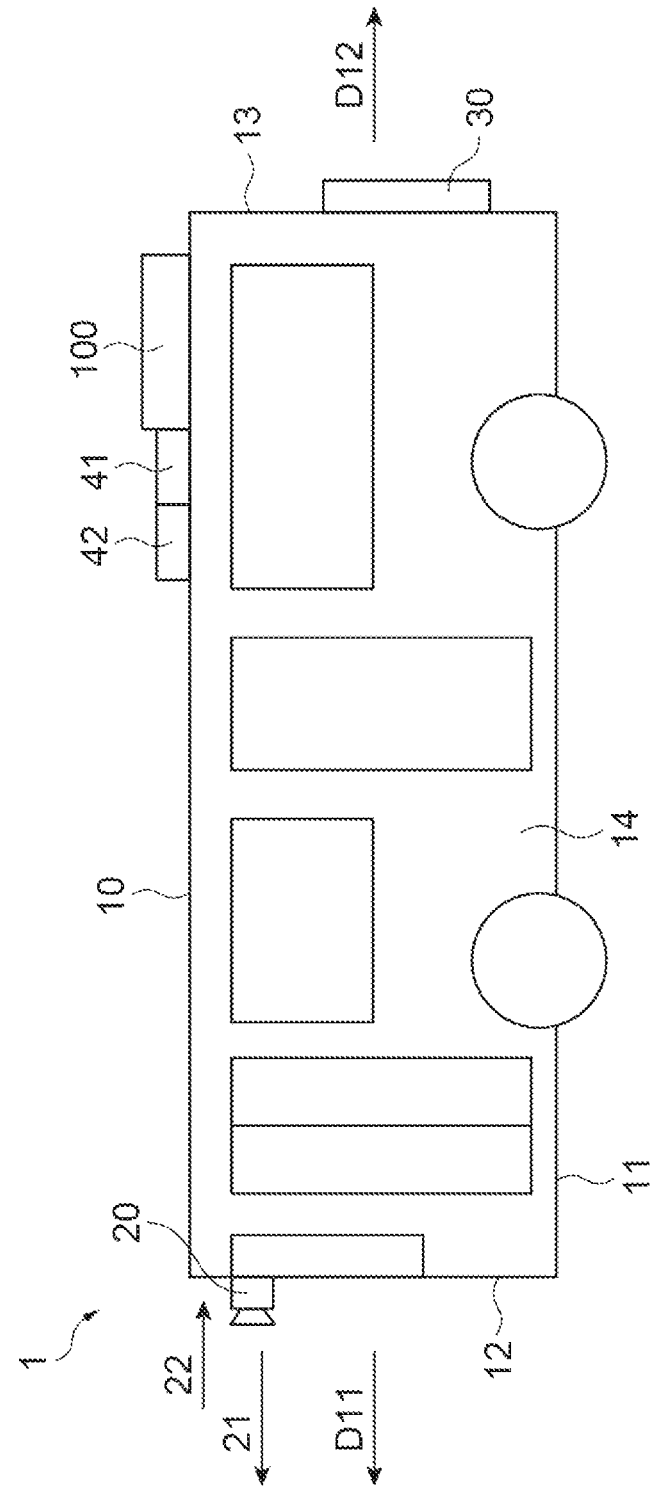
FIG. 1 is a schematic diagram illustrating a schematic configuration of a vehicle.

A vehicle 1 illustrated in FIG. 1 is a bus used for public transportation. The vehicle 1 may be a route bus, a microbus, or a sightseeing bus. The vehicle 1 includes a vehicle body 10, a camera 20, a monitor 30, a GPS sensor 41, a vehicle speed sensor 42, and an image adding device 100.

The vehicle body 10 is configured so that a driver and passengers can board in the vehicle body 10. Although the vehicle body 10 having four wheels is illustrated in the drawing, the vehicle body 10 is not limited to four wheels and may have, for example, six wheels. An outer surface 11 of the vehicle body 10 includes a front face 12 facing the front D11, a rear face 13 facing the rear D12, and a first side face 14 and a second side face 15 facing away from each other (see FIG. 10). As an example, the first side face 14 faces a left direction D21 of the vehicle body 10 (see FIG. 10) and the second side face 15 faces a right direction D22 (see FIG. 10). The second side face 15 may face the left direction D21 and the first side face 14 may face the right direction D22.

The camera 20 is provided in the vehicle body 10 to capture the surroundings of the vehicle body 10. For example, the camera 20 is provided at one position on the outer surface 11 of the vehicle body 10 and faces the direction that the outer surface 11 faces at the one position. The direction that the camera 20 faces is a direction from the placed position of the camera 20 toward the capturing target of the camera 20. Hereinafter, a direction in which the camera 20 faces is referred to as a "viewing direction" of the camera 20.

As an example, the camera 20 is provided in the vehicle body 10 so as to capture a front D11. For example, the camera 20 is provided on the front face 12 so as to face the front D11 (so that a viewing direction 21 coincides a front D11). Being provided on the front face 12 means being provided so as to be able to image an area that the front face 12 faces. In the drawing, the camera 20 is located outside of the front face 12, but the camera 20 may be located inside the vehicle body 10 as long as the camera 20 can image the area that the front face 12 faces. The same applies to a case where the camera 20 is provided on other surfaces. For example, the camera 20 may be provided in the vehicle body 10 so as to capture the front of the vehicle body 10 through a transparent panel (for example, windshield) constituting the front face 12. Examples of the camera 20 include a camera including an imaging device such as a charge coupled device (CCD) image sensor or a complementary metal oxide semiconductor (CMOS) image sensor.

The monitor 30 is provided on a surface facing an opposite direction 22 of the viewing direction 21 of the camera 20 on the outer surface 11 of the vehicle body 10, and displays, toward the opposite direction 22, a real-time image captured by the camera 20. When the camera 20 faces the front D11 as described above, the monitor 30 is provided on the rear face 13 of the vehicle body 10 and displays the real-time image toward the rear D12 of the vehicle body 10. The wording "the monitor 30 is provided on the rear face 13" means that a person directly facing the rear face 13 can visually recognize the display content of the monitor 30 as a part of the rear face 13. In the drawing, the monitor 30 is provided outside the rear face 13, but the monitor 30 may be provided inside the vehicle body 10 as long as it can be visually recognized by a person directly facing the rear face 13.

The real-time image means an image displayed at substantially the same timing as the timing at which the image is captured by the camera 20. The real-time image changes in synchronization with a change in the current situation of the capturing target by the camera 20. In practice, a slight time lag occurs until the image captured by the camera 20 is displayed by the monitor 30 due to the influence of signal transfer, image processing, and the like. If this time lag is negligibly small, the image displayed by the monitor 30 is included in the real-time image.

The GPS sensor 41 receives satellite signals for GPS (Global Positioning System). The vehicle speed sensor 42 detects the running speed of the vehicle body 10.

The image adding device 100 causes the monitor 30 to display an additional image that changes in accordance with the position of the vehicle body 10 based on contents stored, in association with position information, in a database, and the current position of the vehicle body 10. For example, the image adding device 100 repeatedly performs a cycle of detecting the current position of the vehicle body 10 based on the satellite signal received by the GPS sensor 41, extracting contents corresponding to the detected current position from the database, and displaying an additional image indicating the extracted contents on the monitor 30. Hereinafter, this cycle is referred to as an "update cycle". Since contents extracted from database by the image adding device 100 changes in accordance with the position of the vehicle body 10, the additional image displayed by the monitor 30 also changes in accordance with the position of the vehicle body 10. It should be noted that although the term "current position" is used for convenience, the term does not mean a strict current position, but means, for example, a position at one timing in the update cycle described above.

The image adding device 100 may display the additional image on the monitor 30 together with the real-time image, or may display the additional image on the monitor 30 at a timing different from the display timing of the real-time image. When the additional image is displayed on the monitor 30 together with the real-time image, the image adding device 100 may superimpose and display the additional image in the real-time image within a range that does not hinder the visual recognition of the object on the road (for example, a moving object such as an oncoming vehicle or a pedestrian).

Examples of the contents include tourist information, advertisement, news, and the like regarding the current position. For example, the image adding device 100 may cause the monitor 30 to display an additional image including an advertisement corresponding to the position of the vehicle body 10. For example, the image adding device 100 identifies an in-field facility included in the real-time image based on the current position and travel direction of the vehicle 1 and map information, and displays an additional image including an advertisement of the in-field facility on the monitor 30. The image adding device 100 may cause the monitor 30 to display an additional image that associates the advertisement of the in-field facility with the in-field facility in the real-time image.

Figure 2:
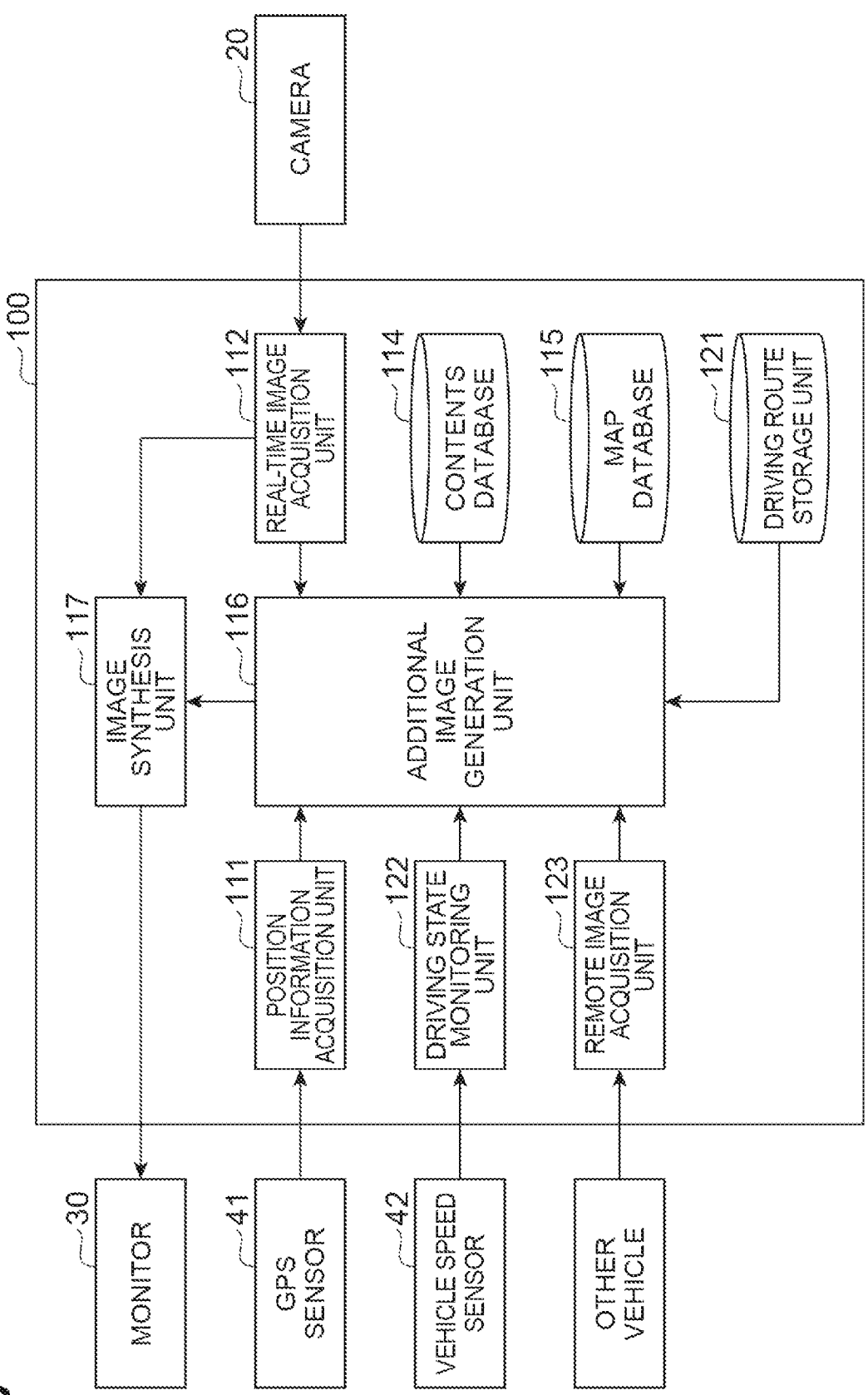
FIG. 2 is a block diagram illustrating a functional configuration of an image adding device.

As an example, the image adding device 100 includes a position information acquisition unit 111, a real-time image acquisition unit 112, a map database 115, a contents database 114, an additional image generation unit 116, and an image synthesis unit 117 as functional components (hereinafter referred to as "functional block"), as illustrated in FIG. 2. The position information acquisition unit 111 acquires the current position information of the vehicle body 10 for every update cycle described above. For example, the position information acquisition unit 111 acquires satellite signals received by the GPS sensor 41 and detects the current position and travel direction of the vehicle body 10 based on the acquired satellite signals. The real-time image acquisition unit 112 acquires a real-time image captured by the camera 20 for every update cycle described above.

The map database 115 stores map data of an area including a driving route of the vehicle body 10. Examples of the map data include two-dimensional map data in which positions and shapes of facilities such as roads and buildings positioned in an area are represented by latitude, longitude, and the like. The map data may be three-dimensional map data representing the positions and the shapes of the facilities by latitude, longitude, and altitude.

The contents database 114 stores a plurality of contents in association with positions. For example, the contents database 114 stores a plurality of advertisement data sets in association with positions. For example, the contents database 114 stores each of a plurality of advertisement data sets in association with a position in the map data.

The additional image generation unit 116 extracts contents corresponding to the current position acquired by the position information acquisition unit 111 from the contents database 114 for each update cycle described above, and generates an additional image indicating the extracted contents. For example, the additional image generation unit 116 generates an additional image including an advertisement corresponding to the position of the vehicle body 10.

For example, the additional image generation unit 116 identifies the in-field facility included in the real-time image (real-time image acquired by the real-time image acquisition unit 112.) based on the current position and travel direction of the vehicle body 10 detected by the position information acquisition unit 111 and map data stored in the map database 115. For example, the additional image generation unit 116 calculates an in-field region included in the visual field of the camera 20 in the map data based on the current position and travel direction of the vehicle body 10 and the angle of view and resolution performance of the camera 20, and identifies an in-field facility included in the in-field region. The additional image generation unit 116 extracts the advertisement data set of the identified in-field facility from the contents database 114, and generates an additional image including the extracted advertisement data set of the in-field facility.

The image synthesis unit 117 synthesizes the real-time image acquired by the real-time image acquisition unit 112 and the additional image generated by the additional image generation unit 116 and displays the synthesized image in the monitor 30 for every update cycle described above. Thus, the additional image is displayed on the monitor 30 together with the real-time image.

The additional image generation unit 116 may generate an additional image to associate the advertisement of the in-field facility with the in-field facility in the real-time image. Associating an advertisement with an in-field facility means visually indicating to which in-field facility the advertisement corresponds by a leader line, an arrow, or the like. For example, the additional image generation unit 116 calculates the display position of the in-field facility in the in-field region based on the current position and travel direction of the vehicle body 10 and the angle of view of the camera 20, and specifies the position to be indicated by a leader line, an arrow, or the like based on the calculated display position.

Figure 3:
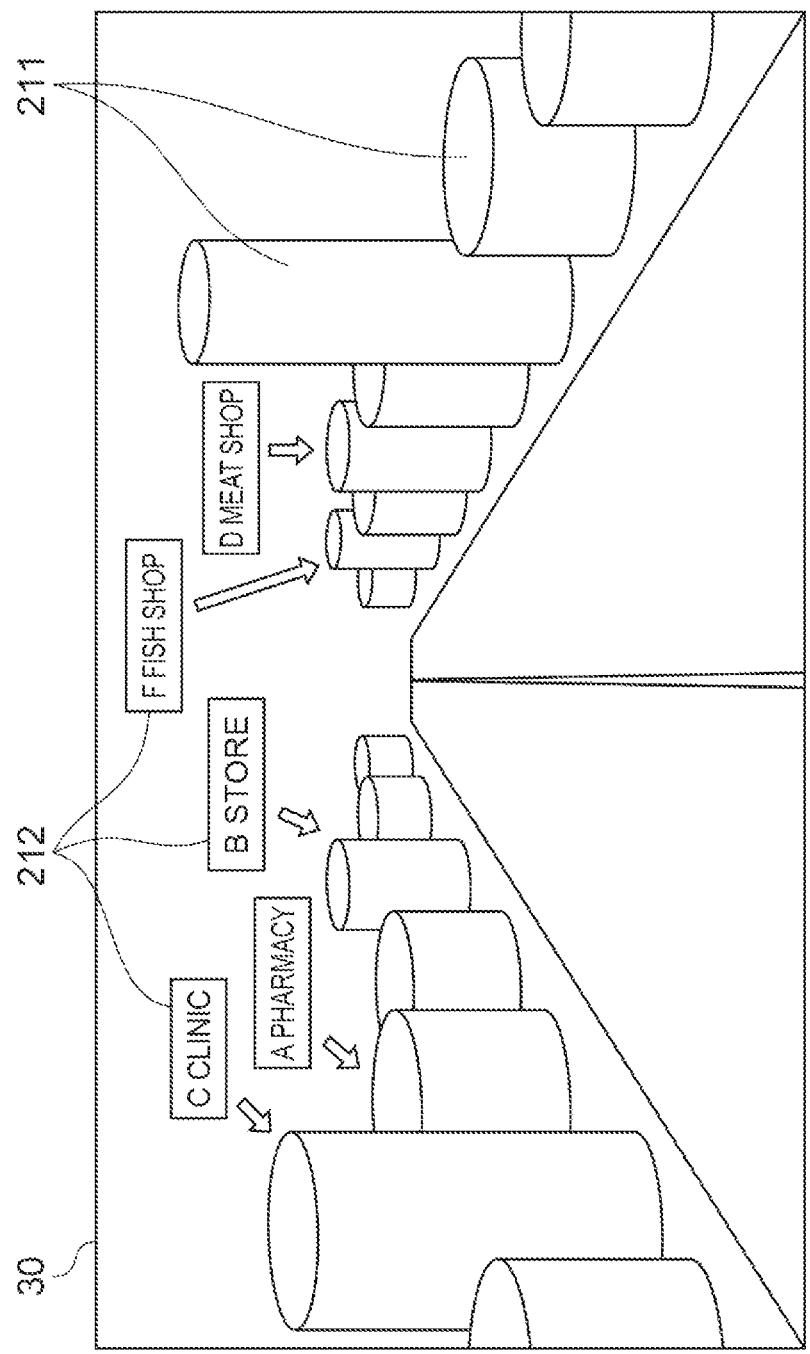
FIG. 3 is a schematic diagram illustrating a composite image of a real-time image and an additional image including advertisements.

FIG. 3 is a schematic diagram illustrating an example additional image that associates an advertisement of an in-field facility with the in-field facility in a real-time image. In this figure, a plurality of facility images 211 corresponding to the in-field facility in the real-time image are associated with a plurality of advertisement images 212 by arrows. Although the name of the advertisement target is included in the advertisement image 212 in the drawing, various other information can be included in the advertisement image 212.

The image adding device 100 may be configured to acquire the map data and the contents data from a server through network communication and update the stored contents of the map database 115 and the contents database 114 with the acquired map data and contents data, respectively. For example, the image adding device 100 calculates an acquisition target area of a predetermined size based on the current position of the vehicle body 10, and acquires map data and contents data of the acquisition target area from a server. The image adding device 100 updates the storage contents of the map database 115 with the acquired map data, and updates the storage contents of the contents database 114 with the acquired contents data.

The image adding device 100 may update the storage contents of the map database 115 and the contents database 114 in each update cycle described above or in each of a plurality of update cycles. After updating the storage contents of the map database 115 and the contents database 114, the image adding device 100 may update the storage contents of the map database 115 and the contents database 114 when the variation amount of the current position in the vehicle body 10 exceeds a predetermined amount.

The image adding device 100 may be configured to cause the monitor 30 to display an additional image that includes an indication of an expected exit position of the vehicle body 10 from the road on which the vehicle body 10 is currently traveling based on the route that the vehicle body 10 is scheduled to travel. Exiting from a road includes a left turn or a right turn to another road that crosses the road. For example, as shown in FIG. 2, the image adding device 100 further includes a driving route storage unit 121 that stores a route along which the vehicle body 10 is going to drive.

The additional image generation unit 116 specifies the expected exit position based on the route stored by the driving route storage unit 121 and the current position acquired by the position information acquisition unit 111 for each update cycle. For example, the additional image generation unit 116 calculates the display position of the expected exit position in the in-field region based on the current position and travel direction of the vehicle body 10 and the angle of view of the camera 20, and includes the exit announcement image indicating the expected exit direction in the additional image in the calculated display position.

Figure 4:
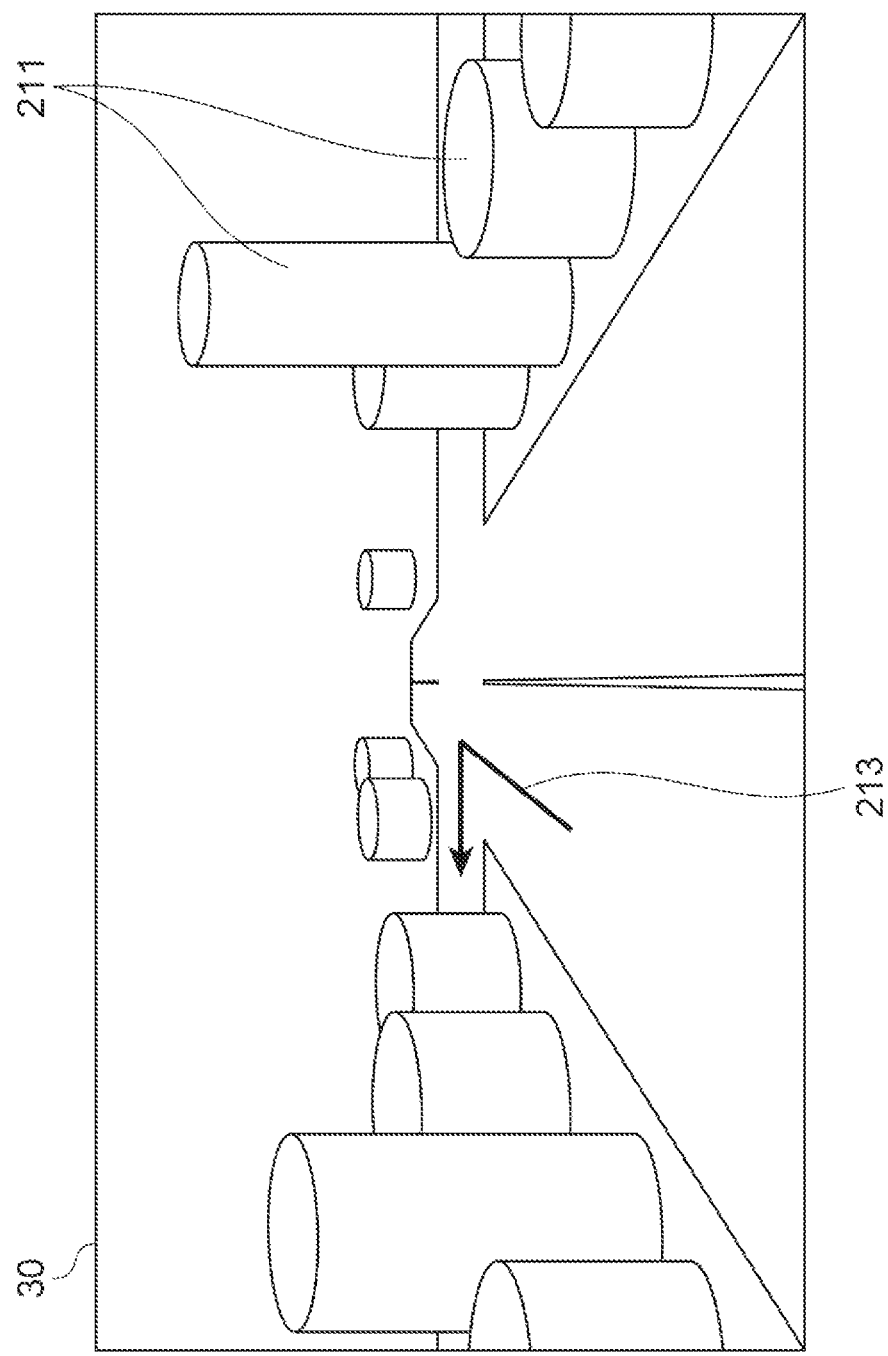
FIG. 4 is a schematic diagram illustrating a composite image of a real-time image and an additional image including an exit announcement image.

FIG. 4 is a schematic diagram illustrating an additional image including an exit announcement image. In this figure, an exit announcement image 213 is displayed in accordance with the display position of the expected exit position in the real-time image.

The image adding device 100 may be configured to reduce, compared to a first stop period in which the vehicle body 10 stops in accordance with a road condition, the display size of the additional image in a second stop period in which the vehicle body 10 stops for boarding or alighting of a person. Reducing the display size of the additional image includes erasing the display of the additional image (setting the display size of the additional image to zero). The image adding device 100 may be configured to fade the display of additional image in the second stop period compared to the first stop period. Fading means making the display of the additional image transparent and displaying the transparent image of the real-time image even in the display position of the additional image.

For example, the image adding device 100 may further include a driving state monitoring unit 122, as illustrated in FIG. 2. The driving state monitoring unit 122 recognizes the first stop period and the second stop period based on at least a vehicle speed detected by the vehicle speed sensor 42 and an opening/closing state of an entrance door of the vehicle body 10. The additional image generation unit 116 sets the display size of the additional image based on the confirmation result by the driving state monitoring unit 122 for each update cycle described above.

For example, when it is determined that the current time is the first stop period, the additional image generation unit 116 sets the display size of the additional image to the first size. If the driving state monitoring unit 122 determines that the current time is the second stop period, the additional image generation unit 116 sets the display size of the additional image to a second size smaller than the first size. The image synthesis unit 117 combines the additional image with the real-time image at the display size set by the additional image generation unit 116, and displays it on the monitor 30.

Figure 5:
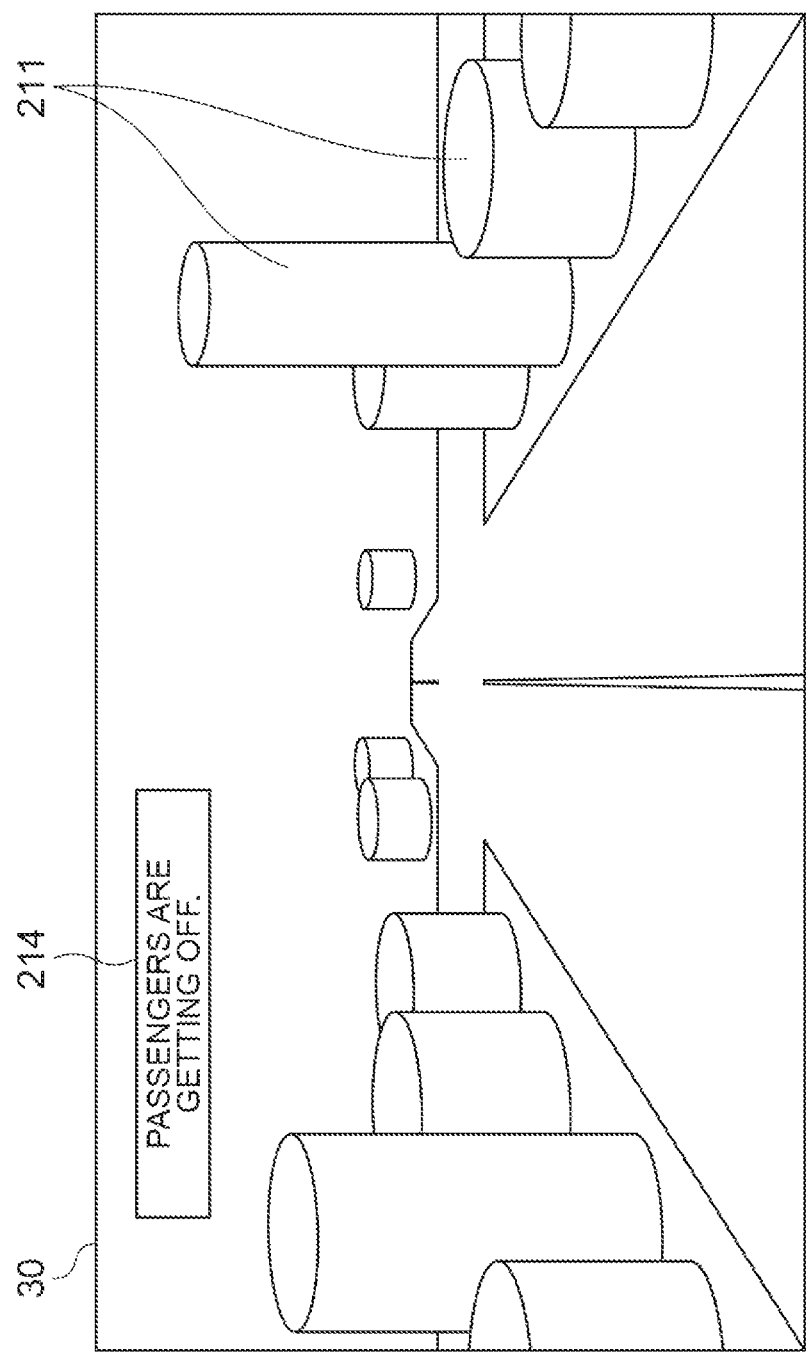
FIG. 5 is a schematic diagram illustrating a composite image of a real-time image and an attention calling image.

The image adding device 100 may be configured to further cause the monitor 30 to display an attention calling image including an indication that a person is boarding or alighting from the vehicle body 10 while the vehicle body 10 is stopped. For example, when it is determined that the vehicle body 10 is stopped by the driving state monitoring unit 122, the additional image generation unit 116 generates an attention calling image 214 including a character string indicating that a person is boarding or alighting from the vehicle body 10. The image synthesis unit 117 combines the attention calling image 214 generated by the additional image generation unit 116 into a real-time image and displays it in the monitor 30 (see FIG. 5).

The image adding device 100 may be configured to cause the monitor 30 to further display an emphasizing image that emphasizes the image of a moving object in the real-time image. For example, the additional image generation unit 116 extracts a moving object such as an oncoming vehicle or a pedestrian from the real-time image, and generates an emphasizing image 216 that emphasizes a moving object image 215 corresponding to the extracted moving object. The image synthesis unit 117 combines the emphasizing image 216 generated by the additional image generation unit 116 into a real-time image and displays it in the monitor 30 (see FIG. 6).

Figure 6:
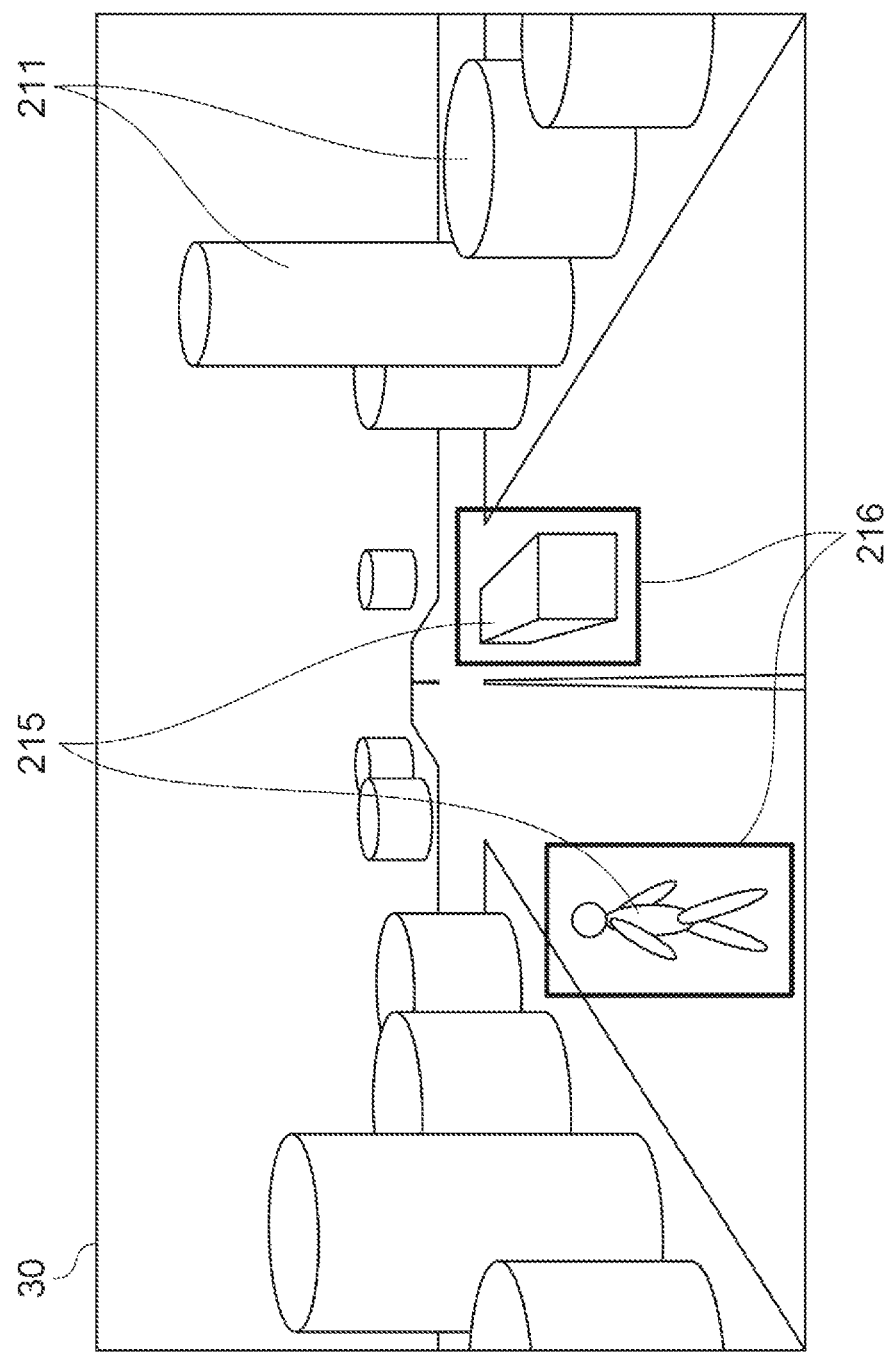
FIG. 6 is a schematic diagram illustrating a composite image of a real-time image and emphasizing images.

In FIG. 6, the emphasizing image 216 in which the moving object image 215 is emphasized by being surrounded by a frame is illustrated, but a method of emphasizing the moving object image 215 is not limited thereto. The additional image generation unit 116 may cause the monitor 30 to display the emphasizing image 216 in which the moving object image 215 is filled with a predetermined highlight color.

The image adding device 100 may be configured to cause the monitor 30 to further display an image received from another vehicle. For example, the image adding device 100 may further include a remote image acquisition unit 123, as illustrated in FIG. 2. The remote image acquisition unit 123 acquires an image data from another vehicle by wireless network communication. The additional image generation unit 116 generates a remote image 217 based on the image data acquired by the remote image acquisition unit 123. The image synthesis unit 117 combines the remote image 217 generated by the additional image generation unit 116 into a real-time image and displays it in the monitor 30 (see FIG. 7).

Figure 7:
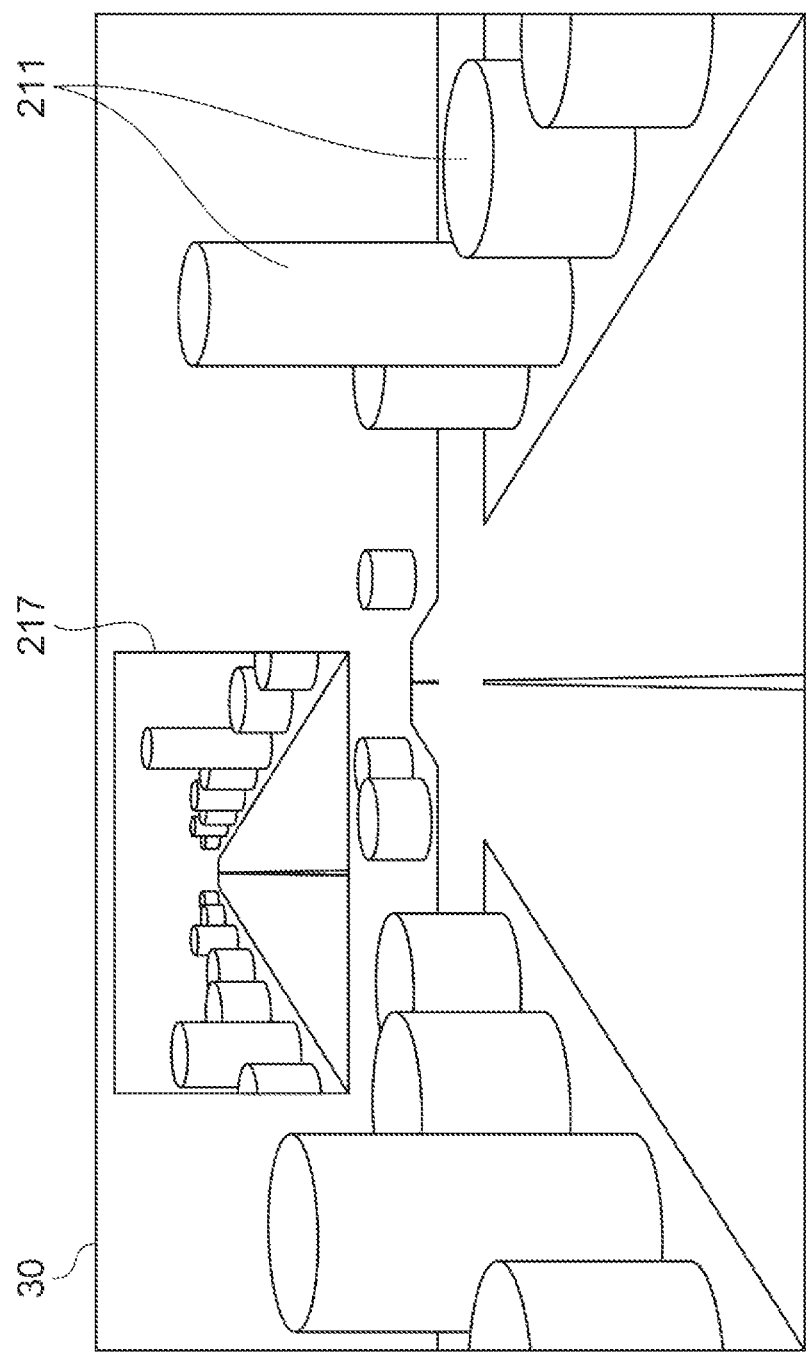
FIG. 7 is a schematic diagram illustrating a composite image of a real-time image and a remote image.

Although FIG. 7 illustrates a case in which a real-time image received from another vehicle is displayed as the remote image 217, the additional image generation unit 116 may generate the remote image 217 further including an additional image received from another vehicle. In addition, the additional image generation unit 116 may generate the remote image 217 including an additional image received from another vehicle and not including the real-time image received from the other vehicle.

Figure 8:
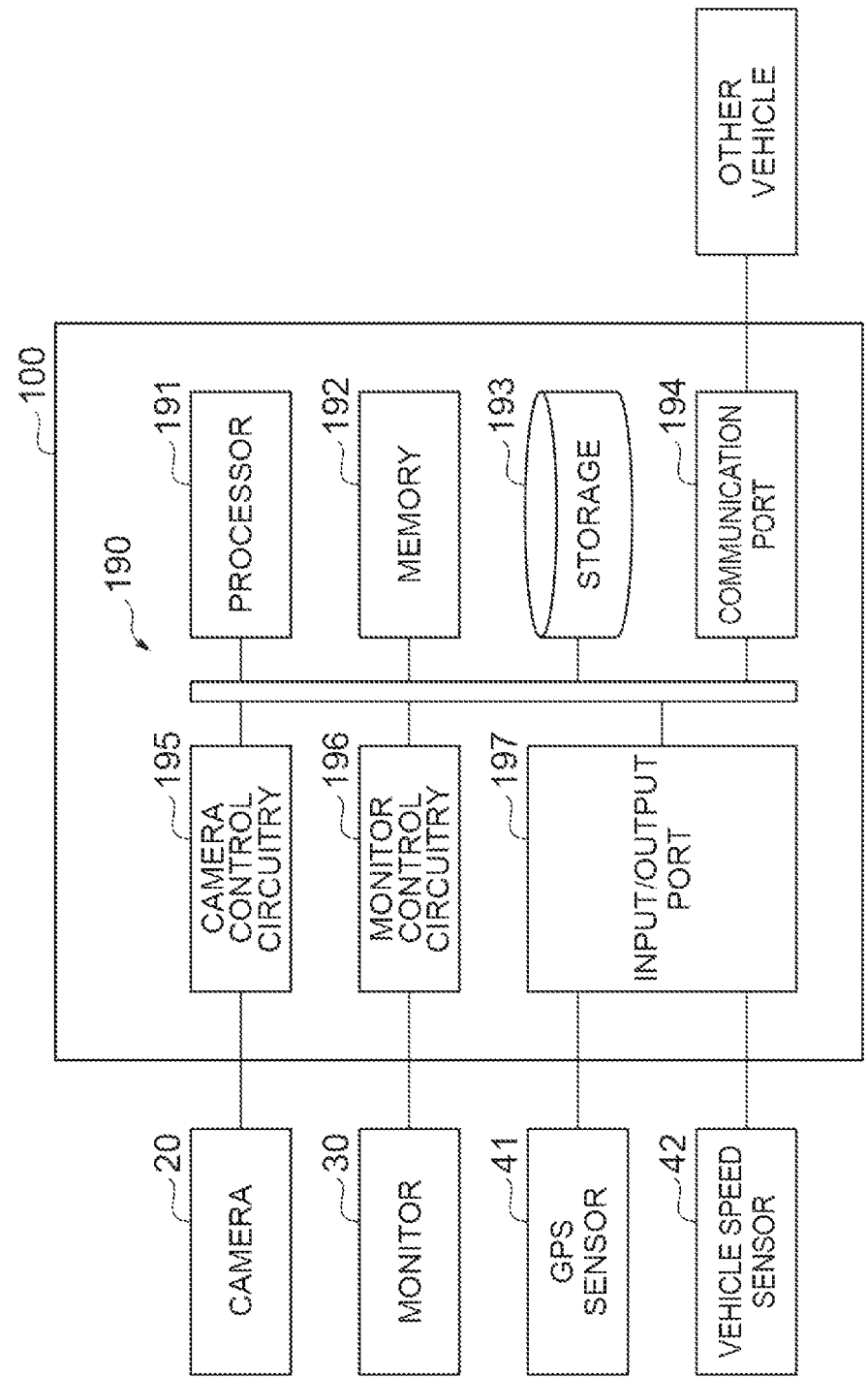
FIG. 8 is a schematic diagram illustrating a hardware configuration of the image adding device.

FIG. 8 is a block diagram illustrating the hardware configuration of the image adding device 100. As illustrated in FIG. 8, the image adding device 100 includes circuitry 190. The circuitry 190 includes at least one processor 191, a memory 192, storage 193, a communication port 194, camera control circuitry 195, monitor control circuitry 196, and an input/output port 197.

The storage 193 stores a program for causing the image adding device 100 to cause the monitor 30 to display an additional image changing in accordance with the position of the vehicle body 10 based on the contents stored in the database in association with the position information and the current position of the vehicle body 10. For example, the image adding device 100 stores a program for configuring each functional block described above in the image adding device 100.

The memory 192 temporarily stores the program loaded from the storage 193. The processor 191 causes the image adding device 100 to function as each of the functional blocks described above by executing the program loaded into the memory 192. The result of the intermediate calculation by the processor 191 is stored in the memory 192.

The camera control circuitry 195 controls the camera 20 in accordance with instructions from the processor 191. Controlling the camera 20 includes causing the camera 20 to acquire an image, causing the camera 20 to transmit the acquired image, and receiving the transmitted image from the camera 20. The monitor control circuitry 196 controls the monitor 30 in accordance with instructions from the processor 191. Controlling the monitor 30 includes transmitting an image data to the monitor 30 and causing the monitor 30 to display an image corresponding to the transmitted image data. The input/output port 197 inputs and outputs information between the GPS sensor 41 and the vehicle speed sensor 42 in accordance with instructions from the processor 191.

The hardware configuration of the image adding device 100 illustrated above is merely an example and may be modified. For example, a part of the above-described functional blocks may be configured by a dedicated device such as an application specific integrated circuit (ASIC).

Figure 9:
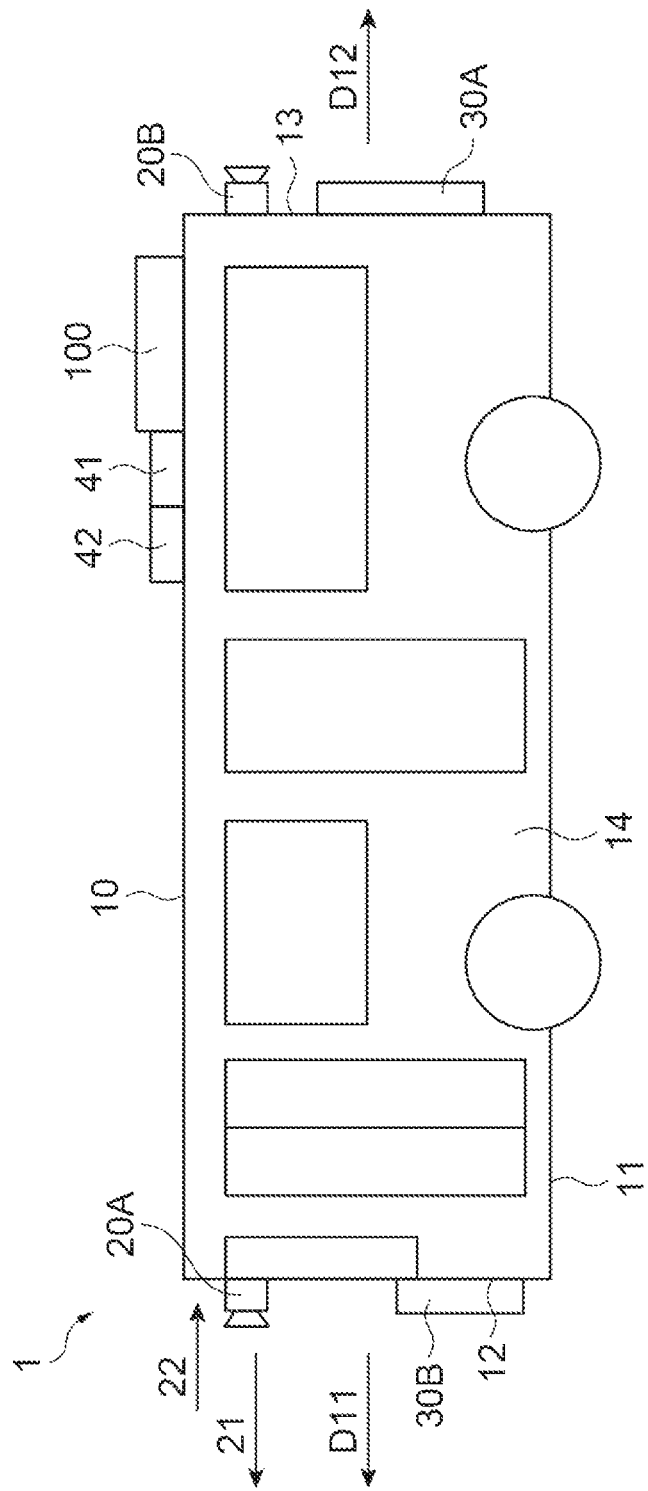
FIG. 9 is a schematic view illustrating a modification of the vehicle.

Although the configuration in which the camera 20 is provided on the vehicle body 10 so as to capture the front D11 of the vehicle body 10 and the monitor 30 is provided on the rear face 13 of the vehicle body 10 is described above, the arrangement of the camera 20 and the monitor 30 is not limited thereto. For example, the camera 20 may be provided on the vehicle body 10 to capture the rear D12 of the vehicle body 10 and the monitor 30 may be provided on the front face 12 of the vehicle body 10 and display a real-time image toward the front D11 of the vehicle body 10. Further, as illustrated in FIG. 9, the vehicle 1 may include: both a set of a camera 20A and a monitor 30A that displays the real-time image of the front D11 of the vehicle body 10 toward the rear D12 of the vehicle body 10; and a set of a camera 20B and a monitor 30B that displays the real-time image of the rear D12 of the vehicle body 10 toward the front D11 of the vehicle body 10. The image adding device 100 may be configured to display the additional image on both the monitor 30A and the monitor 30B.

Figure 10:
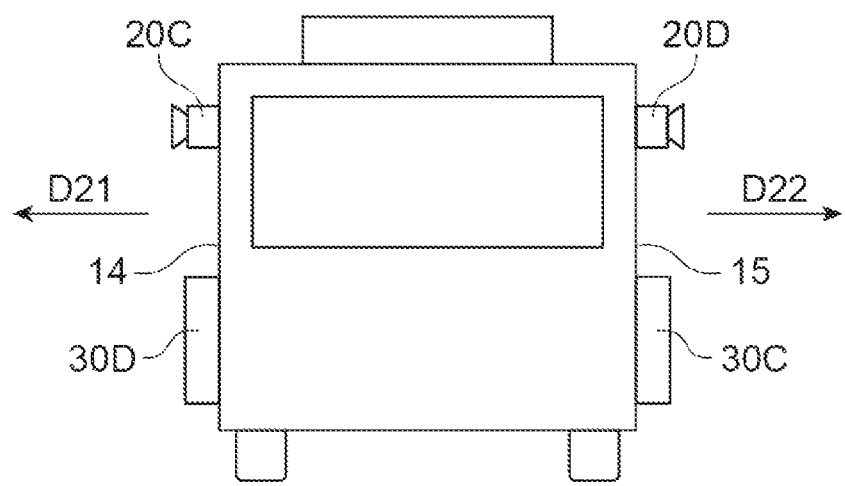
FIG. 10 is a schematic view illustrating another modification of the vehicle.

Further, the camera 20 may be provided on the vehicle body 10 so as to capture the direction that the first side face 14 of the vehicle body 10 faces (for example, the left direction D21), and the monitor 30 may be provided on the second side face 15 of the vehicle body 10 and display the real-time image captured by the camera 20 toward the direction that the second side face 15 faces (for example, the right direction D22). Further, the camera 20 may be provided on the vehicle body 10 so as to capture the direction that the second side face 15 of the vehicle body 10 faces, the monitor 30 may be provided on the first side face 14 of the vehicle body 10 and display the real-time image captured by the camera 20 may be displayed toward the direction that the first side face 14 faces. Further, as illustrated in FIG. 10, the vehicle 1 may include both a set of a camera 20C and a monitor 30C that displays a real-time image of the left direction D21 of the vehicle body 10 towards the right direction D22 of the vehicle body 10 and a set of a camera 20D and a monitor 30D that displays a real-time image of the right direction D22 of the vehicle body 10 towards the left direction D21 of the vehicle body 10.

The vehicle 1 may further include a second camera provided on the vehicle body 10 so as to face between the viewing direction 21 of the camera 20 and the opposite direction 22 and capture surroundings of the vehicle body 10, and the monitor 30 may display the real-time image and a second real-time image captured by the second camera. For example, the vehicle 1 may include the camera 20C (second camera) capturing the left direction D21 and the camera 20D (second camera) capturing the right direction D22 in addition to the camera 20 capturing a front D11, and the monitor 30 may display, toward a rear D12, combination of a real-time image captured by the camera 20 and a second real-time image captured by the camera 20C and the camera 20D.

Image Displaying Procedure

Next, an example displaying procedure of the additional image executed by the image adding device 100 will be described. As illustrated in FIG. 11, the image adding device 100 executes operations S01 and S02. In operation S01, the position information acquisition unit 111 acquires current position information of the vehicle body 10. In operation S02, the real-time image acquisition unit 112 acquires a real-time image captured by the camera 20.

Next, the image adding device 100 executes operations S03, 504, and S05. In operation S03, the additional image generation unit 116 calculates an in-field region included in the visual field of the camera 20 in the map data based on the current position and travel direction of the vehicle body 10 and the angle of view and resolution performance of the camera 20. In operation 504, the additional image generation unit 116 identifies the in-field facility included in the in-field data and extracts the advertisement region set of the in-field facility from the contents database 114. In operation S05, the additional image generation unit 116 generates an additional image including the extracted advertisement data set of the in-field facility.

Next, the image adding device 100 executes operations S06 and S07. In operation S06, the additional image generation unit 116 specifies the expected exit position based on route stored by the driving route storage unit 121 and current position acquired by the position information acquisition unit 111. In operation S07, the additional image generation unit 116 checks whether the distances from the current position to the expected exit position are smaller than a predetermined threshold.

If it is determined in operation S07 that the range from the current position to the expected exit position is less than the predetermined threshold, the image adding device 100 performs operation S08. In operation S08, the additional image generation unit 116 calculates the display position of the expected exit position in the in-field region based on the current position and travel direction of the vehicle body 10 and the angle of view in the camera 20, generates an exit announcement image indicating the expected exit direction in the calculated display position, and includes the exit announcement image in the additional image.

Next, the image adding device 100 executes operation S09. If it is determined in operation S07 that the range from the current position to the expected exit position is greater than the predetermined threshold, the image adding device 100 performs operation S09 without performing operation S08. In operation S09, the additional image generation unit 116 extracts a moving body such as an oncoming vehicle or a pedestrian from the real-time image, and generates the emphasizing image 216 in which the moving object image 215 corresponding to the extracted moving body is emphasized.

Next, the image adding device 100 executes operation S11. In operation S11, the additional image generation unit 116 checks whether the remote image acquisition unit 123 has acquired an image data from another vehicle.

If it is determined in operation S11 that an image data has been acquired from another vehicle, the image adding device 100 executes operation S12. In operation S12, the additional image generation unit 116 generates the remote image 217 based on the image data acquired by the remote image acquisition unit 123.

Next, the image adding device 100 executes operation S13. If it is determined in operation S11 that an image data has not been acquired from another vehicle, the image adding device 100 executes operation S13 without executing operation S12. In operation S13, the driving state monitoring unit 122 checks whether the vehicle body 10 is stopped for boarding or alighting of a person based on the vehicle speed or the like detected by the vehicle speed sensor 42.

If it is determined in operation S13 that the vehicle body 10 is not stopped or is stopped in accordance with the road condition but not for boarding or alighting of a person, the image adding device 100 executes operation S14. In operation S14, the additional image generation unit 116 sets the display size of the additional image to the first size. The image synthesis unit 117 combines an additional image into the real-time image with a display size set by the additional image generation unit 116. Further, the image synthesis unit 117 combines the emphasizing image 216 generated in operation S09 and the remote image 217 generated in operation S12 into the real-time image.

If it is determined in operation S13 that the vehicle body 10 is stopped, the image adding device 100 executes operations S15 and S16. In operation S15, the additional image generation unit 116 generates the attention calling image 214 including a character string indicating that person is getting off from the vehicle body 10. In operation S16, the additional image generation unit 116 sets the display size of the additional image to a second size smaller than the first size. The image synthesis unit 117 combines the additional image into the real-time image with the display size set by the additional image generation unit 116. Further, the image synthesis unit 117 synthesizes the emphasizing image 216 generated in operation S09, the remote image 217 generated in operation S12, and the attention calling image 214 generated in operation S15 into the real-time image.

Next, the image adding device 100 executes operation S17. In operation S17, the image synthesis unit 117 causes the monitor 30 to display an image obtained by combining the real-time image with the additional image, the emphasizing image 216, and the remote image 217. Thus, the update cycle is completed, and the image adding device 100 returns the process to operation S01. Thereafter, the update cycle is repeatedly executed.

As described above, the vehicle 1 includes: the camera 20 provided on the vehicle body 10 so as to capture the surroundings of the vehicle body 10; the monitor 30 provided on a surface facing an opposite direction 22 of a direction that the camera 20 faces among outer surfaces of the vehicle body 10 and configured to display, toward the opposite direction 22, a real-time image captured by the camera 20; and the image adding device 100 configured to cause the monitor 30 to display an additional image changing in accordance with the position of the vehicle body 10 based on contents stored, in association with position information, in a database, and the current position of the vehicle body 10.

According to this the vehicle 1, by displaying an additional image corresponding to the current position of the vehicle 1 on the monitor 30, information corresponding to the current position of a person may be transmitted to the person. Thus, the monitor 30 for transmitting information to the outside of the vehicle can further be utilized.

The image adding device 100 may be configured to cause the monitor 30 to display the additional image including an advertisement in accordance with the position of the vehicle body 10. The monitor 30 can further be utilized for advertisement.

The image adding device 100 may be configured to: identify an in-field facility included in the real-time image based on the current position and a travel direction of the vehicle 1 and map information; and cause the monitor 30 to display the additional image including an advertisement of the in-field facility. Displaying the advertisement related to the image of the camera 20 may therefore be improved.

The image adding device 100 may be configured to cause the monitor 30 to display the additional image that associates the advertisement of the in-field facility with the in-field facility in the real-time image. The monitor 30 can further be utilized by a synergistic effect of the information transmission by the image of the camera 20 and the information transmission by the additional image.

The camera 20 may be provided on the vehicle body 10 to capture the front D11 of the vehicle body 10, and the monitor 30 may be provided on the rear face 13 of the vehicle body 10 and configured to display the real-time image toward the rear D12 of the vehicle body 10. The monitor 30 can further be utilized to transmit information to a following vehicle.

The image adding device 100 may be configured to cause the monitor 30 to display the additional image including an indication of the expected exit position of the vehicle body 10 from the road on which the vehicle body 10 currently travels based on a route along which the vehicle body 10 is scheduled to travel. The stress on the driver of the following vehicle may be reduced and unreasonable passing may be prevented.

The camera 20 may be provided on the vehicle body 10 to capture the rear D12 of the vehicle body 10, and the monitor 30 may be provided on the front face 12 of the vehicle body 10 and configured to display the real-time image toward the front D11 of the vehicle body 10. When the vehicle 1 stops at an intersection for waiting for a right turn, the monitor 30 can further be utilized to transmit information to the driver of an oncoming vehicle waiting for a right turn at the same intersection.

The camera 20 may be provided on the vehicle body 10 to capture the direction that the first side face 14 of the vehicle body 10 faces, and the monitor 30 may be provided on the second side face 15 of the vehicle body 10 and configured to display the real-time image captured by the camera 20 toward the direction that the second side face 15 faces. The monitor 30 can further be utilized to transmit information to a pedestrian on a sidewalk, for example.

The vehicle 1 may further include a second camera provided on the vehicle body 10 so as to face between the direction that the camera 20 faces and the opposite direction 22 and configured to capture the surroundings of the vehicle body 10, and the monitor 30 may be configured to display the real-time image and a second real-time image captured by the second camera. By widening the visual field range by using both the camera 20 and the second camera, the benefit of the image displayed on the monitor 30 may be increased and the information transmission effect by the monitor 30 may be improved.

The image adding device 100 may be configured to reduce, compared to the first stop period in which the vehicle body 10 stops in accordance with the road condition, a display size of the additional image in the second stop period in which the vehicle body 10 stops for boarding or alighting of the person. In the second stop period, it is considered that the necessity of the image of the camera 20 increases compared to the first stop period. For example, in the second stop period, the person is more likely to cross the road to board or alight from the vehicle 1, and thus the image of the front of the vehicle may be more important in the following vehicle. Therefore, by making the display size of the additional image in the second stop period smaller than that in the first stop period, information that matches the needs more may be transmitted.

The image adding device 100 may be configured to fade, compared to the first stop period in which the vehicle body 10 stops in accordance with the road condition, a display of the additional image in the second stop period in which the vehicle body 10 stops for boarding or alighting of the person. Also, by fading the display of the additional image in the second stop period compared to that in the first stop period, information that matches the needs more may be transmitted.

The image adding device 100 may be configured to cause the monitor 30 to further display an attention calling image including an indication that a person is boarding or alighting from the vehicle body 10 while the vehicle body 10 stops. Accordingly, the image displayed on the monitor 30 may be improved, and the information transmission by the monitor 30 may be improved.

The image adding device 100 may be configured to cause the monitor 30 to further display an emphasizing image that emphasizes an image of the moving object in the real-time image. Accordingly, the image displayed on the monitor 30 may be improved, and the information transmission by the monitor 30 may be improved.

The image adding device 100 may be configured to cause the monitor 30 to further display an image received from another vehicle 1 in order to improve the image displayed to the monitor 30, and to improve the information transmission by the monitor 30.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A vehicle display system comprising:
a camera provided on a vehicle body so as to capture a real-time image of surroundings of the vehicle body, wherein the camera is oriented toward a direction of interest;
a monitor configured to display the real-time image captured by the camera, wherein the monitor is oriented toward an opposite direction to the direction of interest; and
circuitry configured to:
cause the monitor to display an additional image in a first stop period in which the vehicle body stops in accordance with a road condition, wherein a display of the additional image changes in accordance with a position of the vehicle body; and
reduce a size of the display of the additional image in a second stop period in which the vehicle body stops for boarding or alighting of a passenger.

2. The system according to claim 1, wherein the circuitry is further configured to cause the monitor to display the additional image including an advertisement in accordance with the position of the vehicle body.

3. The system according to claim 1, wherein the circuitry is further configured to:
identify an in-field facility included in the real-time image based on the position and a travel direction of the vehicle body, and map information; and
cause the monitor to display the additional image including an advertisement of the in-field facility.

4. The system according to claim 3, wherein the circuitry is further configured to cause the monitor to display the additional image that associates the advertisement of the in-field facility with the in-field facility in the real-time image.

5. The system according to claim 1, wherein the camera is configured to capture the real-time image toward a front of the vehicle body, and
wherein the monitor is provided on a rear end of the vehicle body and configured to display the real-time image toward a rear of the vehicle body.

6. The system according to claim 5, wherein the circuitry is further configured to cause the monitor to display the additional image including an indication of an expected exit of the vehicle body from a road on which the vehicle body currently travels based on a route along which the vehicle body is scheduled to travel.

7. The system according to claim 1, wherein the camera is configured to capture the real-time image toward a rear of the vehicle body, and
wherein the monitor is provided on a front of the vehicle body and configured to display the real-time image toward a front of the vehicle body.

8. The system according to claim 1, wherein the camera is configured to capture the real-time image toward the direction of interest on a first side of the vehicle body, and
wherein the monitor is provided on a second side of the vehicle body and configured to display the real-time image in the opposite direction.

9. The system according to claim 1, further comprising a second camera provided on the vehicle body so as to face between the direction of interest that the camera faces and the opposite direction, and configured to capture a second real-time image of the surroundings of the vehicle body,
wherein the monitor is configured to display both the real-time image and the second real-time image.

10. The system according to 1, wherein the circuitry is configured to cause the monitor to further display an alert to indicate that the passenger is boarding or alighting from the vehicle body during the second stop period, wherein the alert is displayed together with the reduced display of the additional image.

11. The system according to 1, wherein the circuitry is configured to cause the monitor to further display an emphasizing image that emphasizes an image of a moving object in the real-time image together with the diminished reduced display of the additional image during the second stop period.

12. The system according to 1, wherein the circuitry is configured to cause the monitor to further display an image received from another vehicle.

13. A vehicle display system comprising:
a camera provided on a vehicle body so as to capture a real-time image of surroundings of the vehicle body, wherein the camera is oriented toward a direction of interest;
a monitor configured to display the real-time image captured by the camera, wherein the monitor is oriented toward an opposite direction to the direction of interest; and
circuitry configured to:
cause the monitor to display an additional image in a first stop period in which the vehicle body stops in accordance with a road condition, wherein a display of the additional image changes in accordance with a position of the vehicle body; and
cause an image brightness of the display of the additional image to fade in a second stop period in which the vehicle body stops for boarding or alighting of a passenger.

14. A method comprising:
receiving a real-time image of surroundings of a vehicle body captured by a camera provided on the vehicle body, wherein the camera is oriented toward a direction of interest;
displaying the received captured image on a monitor provided on the vehicle body, wherein the monitor is oriented toward an opposite direction to the direction of interest;
causing the monitor to display an additional image in a first stop period in which the vehicle body stops in accordance with a road condition, wherein a display of the additional image changes in accordance with a position of the vehicle body; and
reducing a size of the display of the additional image in a second stop period in which the vehicle body stops for boarding or alighting of a passenger.

15. The method according to claim 14, further comprising causing the monitor to display an alert to indicate that the passenger is boarding or alighting from the vehicle body during the second stop period, wherein the alert is displayed together with the reduced display of the additional image.

16. The method according to claim 14, further comprising causing the monitor to further display an emphasizing image that emphasizes an image of a moving object in the real-time image together with the reduced display of the additional image during the second stop period.

17. The method according to claim 14, wherein said causing the monitor to display the additional image in the first stop period comprises causing the monitor to display the additional image including an indication of an expected exit of the vehicle body from a road on which the vehicle body currently travels based on a route along which the vehicle body is scheduled to travel.

18. A non-transitory memory device having instructions stored thereon that, in response to execution by a processing device, cause the processing device to perform operations comprising:

receiving a real-time image of surroundings of a vehicle body captured by a camera provided on the vehicle body, wherein the camera is oriented toward a direction of interest;

displaying the received captured image on a monitor provided on the vehicle body, wherein the monitor is oriented toward an opposite direction to the direction of interest;

causing the monitor to display an additional image in a first stop period in which the vehicle body stops in accordance with a road condition, wherein a display of the additional image changes in accordance with a position of the vehicle body; and causing an image brightness of the display of the additional image to fade in a second stop period in which the vehicle body stops for boarding or alighting of a passenger.

19. The non-transitory memory device according to claim 18, wherein the operations further comprise causing the monitor to display an alert to indicate that the passenger is boarding or alighting from the vehicle body during the second stop period, wherein the alert is displayed together with the faded display of the additional image.

20. The non-transitory memory device according to claim 18, wherein the operations further comprise causing the monitor to further display an emphasizing image that emphasizes an image of a moving object in the real-time image together with the faded display of the additional image during the second stop period.

\* \* \* \* \*